March 31, 1964  H. M. BLUMENSHINE  3,127,486
ELECTRIC SWITCH HAVING OBJECT SENSING OPERATING MEANS
Filed March 6, 1961  2 Sheets-Sheet 1
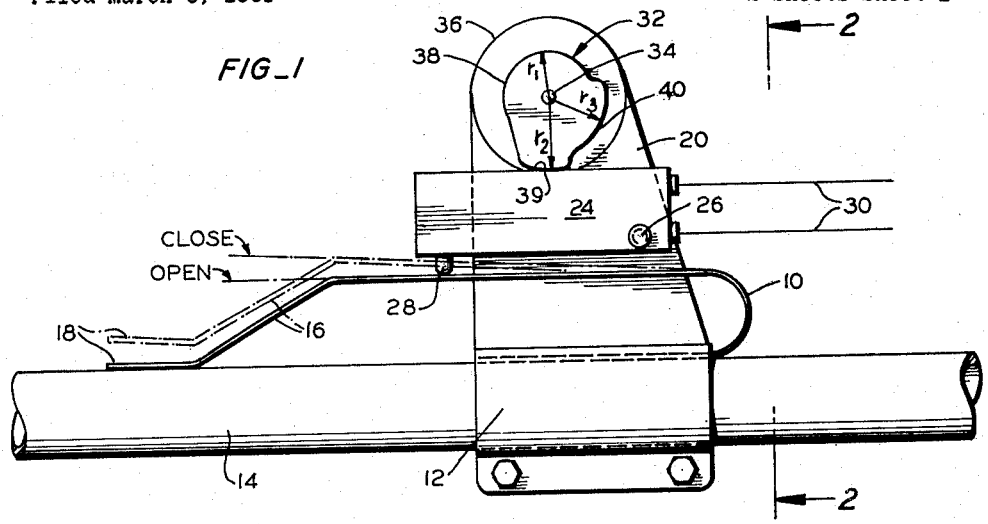
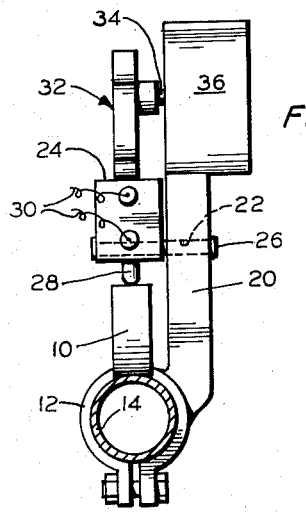
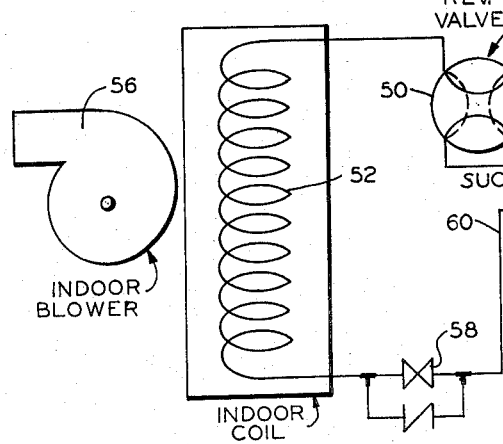
INVENTOR.
HUGH M. BLUMENSHINE
BY Christie, Parker & Hale
ATTORNEYS

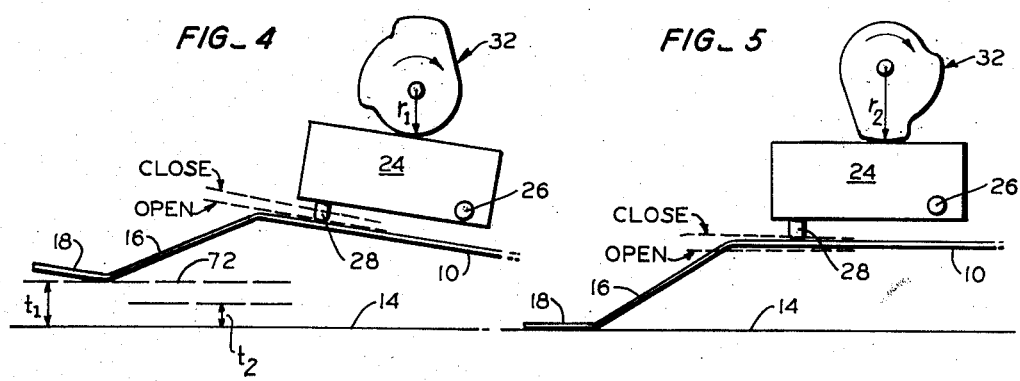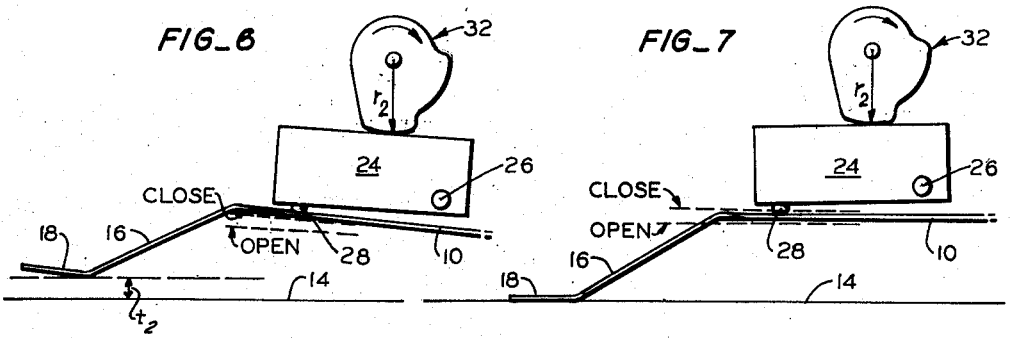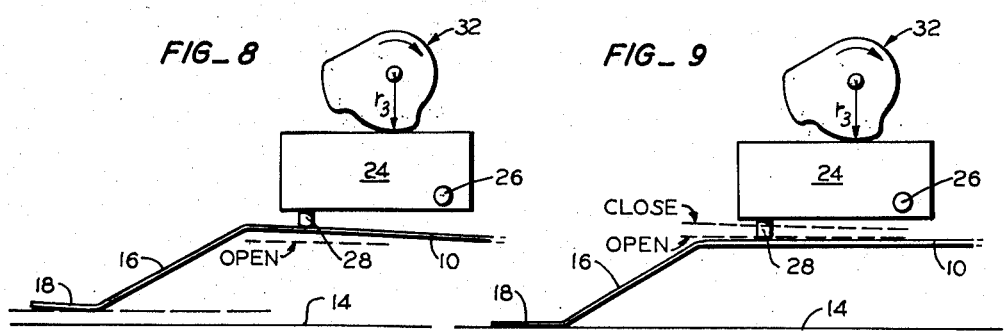

United States Patent Office 3,127,486
Patented Mar. 31, 1964

3,127,486
ELECTRIC SWITCH HAVING OBJECT
SENSING OPERATING MEANS
Hugh M. Blumenshine, Whittier, Calif., assignor to The
Siegler Corporation, Pasadena, Calif., a corporation of
Delaware
Filed Mar. 6, 1961, Ser. No. 93,425
5 Claims. (Cl. 200—61.42)

This invention relates to sensing devices for detecting the position of an article.

Although the sensing device of this invention has many different uses, it is particularly useful for automatically defrosting a refrigerated surface, and the invention is described in detail with respect to that application.

In many types of refrigeration apparatus, such as household refrigerators, and air conditioning units, there is the problem of frost accumulation on refrigerated surfaces, and it is often desirable to have means for automatically removing the frost when it exceeds certain limits.

Various types of automatic defrosters have been used, but they are subject to some disadvantages. For example, in one type the automatic defroster is turned on as soon as the frost reaches a preset limit and the defrosting cycle is turned off as soon as the frost melts below that preset amount. Such units have the disadvantage of tending to cut on and off frequently, and also fail to defrost completely during the defrosting cycle. Attempts have been made to overcome these defects by artificially building up large frost deposits in local areas, and isolating those areas to induce a thermal lag in an attempt to achieve more complete defrosting. But these approaches increase the frost load on the equipment and produce an environment in local areas which are not always representative of the actual conditions under which the unit is operating.

This invention overcomes the disadvantages of the prior art devices by providing automatic defrosting when the frost reaches a certain predetermined limit, but the defrosting cycle is maintained on by positive means for a definite period of time, even though all the frost is removed from the immediate vicinity where the presence of the frost was originally detected. Thereafter, the defrosting cycle is interrupted. With the sensing device of this invention, the presence of an excessive amount of frost is detected, and the frost is completely removed without artificially depositing excessive amounts of frost in the system and without artificially creating a thermal lag in the system.

Briefly, this invention contemplates apparatus for defrosting a component having a surface on which frost accumulates. The apparatus includes defrosting means for increasing the temperature of the surface, and means for sensing the presence of frost on it. Means are also provided to be responsive to the frost sensing means and activate the defrosting means when frost is on the surface. Means are provided for maintaining the defrosting means actuated independently of the presence of frost on the surface so that even if frost is removed entirely from the surface in the vicinity of the sensing means, the defrosting means continues to be actuated to insure complete defrosting of the entire surface.

In the preferred form of the invention, means are provided for deactivating the defrosting means independently of the presence of frost after a period of activation of the defrosting means. In another form, means are provided for deactivating the defrosting means in response to the absence of frost after the defrosting means has been maintained in an activated condition independently of the presence of frost.

The preferred apparatus for actuating the defrosting means senses the position of a surface on a component, say the surface of frost on a refrigerated surface, by the use of a movable arm disposed adjacent the surface. A switch having a control plunger for operating it is disposed with the plunger adapted to engage the arm, and means are provided for moving the switch toward and away from the surface so the switch plunger engages the arm and moves it toward and away from the surface. As the arm engages the surface, the switch moves relative to the arm, and the plunger is actuated in accordance with the position of the frost surface. Thus, as the frost builds up and its surface approaches the arm, the plunger is moved sufficiently to actuate the switch and control the defrosting means.

Preferably, the switch has hysteresis so that the plunger changes the switch from one condition to another in one position and reverses the condition of the switch when the plunger is in a different position. The preferred means for moving the switch and arm toward and away from the surface is a cam driven by a synchronous clock or motor. As the layer of frost builds up above the desired amount, the cam moves the switch and arm relative to the frost so that the arm engages the frost and moves the plunger sufficiently to change the condition of the switch and thereby activate the defrosting means. The plunger must move in the opposite direction a substantial distance before the switch is restored to its original condition to deactivate the defrosting means, so that even though the frost melts below the amount which activates the switch, such melting is not sufficient to interrupt the defrosting cycle.

These and other aspects of the invention will be more fully understood from the following detailed description taken in conjunction with the accompanying drawing in which:

FIG. 1 is a side elevation of the presently preferred embodiment of the invention;

FIG. 2 is a view taken on line 2—2 of FIG. 1;

FIG. 3 is a schematic diagram showing the installation of the apparatus of FIGS. 1 and 2 on a combination heating and cooling system; and FIGS. 4 through 9 are schematic diagrams showing the operation of the apparatus of FIGS. 1 and 2 for various frost conditions on a refrigerated surface.

Referring to FIGS. 1 and 2, the sensing device of this invention includes an elongated leaf spring 10 secured by a clamp 12 to a pipe 14 through which refrigerant may flow as in a conventional refrigeration unit. As shown best in FIG. 1, in its normal state the spring makes a U-bend from the clamp to extend upwardly and then parallel to the pipe for a substantial distance. The free end of the leaf spring includes an inclined portion 16 which extends down toward the pipe, and a feeler section 18 attached at one end to a section 16 and disposed relatively close to the surface of the pipe.

An upwardly extending bracket 20 is formed integrally at its lower portion with the clamp, and includes a horizontal bore 22 located above the pipe and extending perpendicular to it. A microswitch 24 is mounted above the leaf spring on one end of a horizontal rotatable shaft 26 disposed in the bore 22 of the bracket. As shown best in FIG. 1, the shaft 26 is located near one end of the microswitch so that the other end tends to pivot about the shaft in a counter clockwise direction (as viewed in FIG. 1), causing a downwardly extending actuating plunger 28 on the microswitch to ride on the top surface of the leaf spring. Preferably, the microswitch is of the conventional and well-known type which has mechanical hysteresis, i.e., the switch is changed from one condition to another by moving the plunger to one position, and the switch is restored to its original state by moving the plunger to a second position. For example, the switch in FIG. 1 "breaks" or opens which the plunger is in the solid position shown in FIG. 1 and "makes" or closes when the plunger is moved up to the dotted line position, which is indicated by the horizontal phantom line marked "close." The microswitch also includes the usual electrical leads 30 which operate a control circuit as described in more detail below with respect to FIG. 3.

A cam 32 is mounted above the microswitch on one end of a horizontal rotatable shaft 34, which is driven by a conventional gear synchronous clock 36 mounted on top of the bracket 20.

As shown best in FIG. 1, the cam has a first lobe 38 of radius $r_1$, a second lobe 39 of radius $r_2$, and a third lobe 40 of radius $r_3$. The first lobe 38 has the smallest radius and the largest arc around the cam so that the first lobe depresses the switch the least but is in contact with it most of the time. The second lobe 39 has the largest radius and the shortest arc so that it depresses the switch the maximum amount but is in contact with it the shortest length of time. The third lobe has a radius between those of the first and second lobes, and the length of its arc is less than that of the first lobe and greater than that of the third lobe. The cam is rotated in a clockwise direction (as viewed in FIG. 1) so that the top of the switch is contacted successively by the first, second, and third lobes, and moved up and down. As the switch moves, the plunger bears against the spring, which is free to deflect without moving the plunger relative to the switch, as long as the free end of the spring, i.e., feeler section 18, is unrestrained. However, the intermediate (horizontal) portion of the spring is sufficiently rigid that if the free end of the spring contacts a solid surface while moving down, the plunger is thereafter moved relative to the switch by any further movement of switch in the same direction.

The sensing device shown in FIGS. 1 and 2 can be used in many different applications. One such use is shown in FIG. 3, which is a schematic flow diagram of a household heating and refrigeration unit 42, which includes the usual motor driven compressor 44, having a suction line 46 and a discharge line 48 adapted to be connected through a reversing valve 50 to either an indoor coil 52 or an outdoor coil 54. With the valve in the solid line position shown in FIG. 3, the unit is set for winter operation so that the indoor coil receives compressed refrigerant from the compressor discharge. An indoor blower 56 draws room air over the indoor coil so that the warm refrigerant is condensed and gives up heat. The condensed refrigerant flows through a first valve 58, a first line 60, a receiver 62, a second line 64, a second valve 66, and into the outdoor coil, where the condensed refrigerant evaporates and takes up heat from the outside air, which is blown over the outdoor coil by an outdoor fan 67. The vaporized refrigerant flows from the outdoor coil through a return line 68 and the reversing valve to the suction of the compressor, where it is compressed and recirculated as just described.

The sensing means of FIGS. 1 and 2 is attached to the vapor return line 68, where frost tends to accumulate during the winter operation of the unit. The presence of an excessive amount of frost on the vapor return line and on the outdoor coil reduces the heat transfer efficiency of the coil, and therefore should be kept below certain limits. The control leads 30 from the microswitch are connected to a relay 69 which actuates a master switch 70 to control power supplied through power lines 71 to the compressor 44. When the microswitch is open, the relay is deenergized and the master switch 70 is in the closed position shown in FIG. 3 so that power is supplied to the compressor and refrigerant is circulated as described above. When the microswitch is closed, the relay is energized, causing the master switch 70 to open and stop the operation of the compressor.

The operation of the sensing device to defrost automatically a refrigeration unit such as that shown in FIG. 3 is best understood by referring to the schematic diagrams shown in FIGS. 4 through 9, in which the sensing portion 18 of the leaf spring 10 is urged toward the pipe 14 by the plunger 28 of the microswitch 24, which in turn is moved toward and away from the pipe by the action of the cam 32. With the first lobe on the cam in contact with the switch, the spring 10 moves upwardly to lift feeler 18, plunger 28, and switch 24 to the position shown in FIG. 4.

The synchronous clock 36 is set to drive the cam at some suitable speed, say one complete revolution every thirty minutes. The length of the arc of the first lobe on the cam is such that it is in contact with the switch for about 20 minutes. The length of the third lobe is such that it is in contact with the switch for about six minutes, and the second lobe is in contact with the switch for the balance of the cycle. It is also assumed that the switch closes when the plunger moves in to the dotted line position shown in FIG. 4 and identified by the dashed line marked "close," and opens when the plunger returns to the dashed line marked "open." Thus, as shown in FIG. 4, with the first lobe in contact with the microswitch, and a layer of frost 72 having a thickness $t_1$ on the pipe, the microswitch plunger 28 is extended beyond the open position so that the switch is open, and the relay is not energized, thus permitting the compressor to operate and pump vaporized refrigerant through the vapor return line 68. It is assumed that the defrosting means is to be actuated when the frost exceeds a critical thickness indicated by the dimension $t_2$, which is less than $t_1$. Thus it will be seen, that even though the frost on the pipe exceeds the critical amount $t_2$ the unit is not defrosted as long as the first lobe is in contact with the microswitch.

FIG. 5 shows a different phase of operation in which there is no frost on the pipe, and the second lobe is in contact with the switch. In this part of the cycle, the switch is depressed a maximum amount, but it is insufficient to move the plunger in far enough to energize the defrost circuit.

In FIG. 6, the frost is present in an amount equal to the critical thickness $t_2$ as the second lobe engages the microswitch so that the plunger is pushed in sufficiently far to close the microswitch, and activate the relay and defrost cycle. In this case, the relay opens the master switch 70, and the compressor is turned off so that the return line 68 and outdoor coil 54 of the unit shown in FIG. 3 warm up.

FIG. 7 shows that even though all of the frost melts from the pipe while the second lobe is still in contact with the microswitch that the plunger 28 does not move out far enough to open the microswitch and deactivate the defrosting cycle. Therefore, the defrost cycle continues even though the frost is melted from the vicinity of where the pipe is contacted by the leaf spring 10. This has the advantage of giving the rest of the system a chance to defrost, and also avoids the possibility of premature interruption of the defrosting cycle due to any tendency of the spring to cause the frost to melt faster where the spring contacts it.

FIG. 8 shows the situation in which a small amount of frost, say a thickness less than $t_2$, is still on the pipe as the third lobe contacts the microswitch. In this case, the switch is still sufficiently depressed so that the plunger does not return to the open position and the defrost cycle is maintained to effect further melting of the frost.

As shown in FIG. 9, if all of the frost is melted from the pipe when the third lobe engages the microswitch, then the plunger is returned to the open position so the defrost cycle is interrupted. The third lobe is not essential to the operation of the unit, but it does provide for reduced defrosting time when the frost is rapidly melted. From the foregoing description, it will be noted that the hysteresis differential, multiplied by the lever arm action of the leaf spring, should exceed the thickness $t_2$ of frost to be measured.

From the foregoing description it will be apparent that this invention provides sensing means for automatically actuating a defrosting cycle when the frost on a refrigerated surface exceeds a predetermined amount. Moreover, the defrosting cycle is maintained active even though the frost decreases below the predetermined amount and even though the frost melts entirely from the local area where the sensing means operates. Finally, the system deactivates the defrosting cycle even though some frost may be still present to avoid a defrosting cycle of excessive length.

I claim:

1. Apparatus for sensing the presence of frost on a surface of a component, the apparatus comprising a movable arm having a sensing portion disposed adjacent the surface, yieldable means urging the sensing portion of the arm away from the surface, a switch having a control plunger for operating it, the switch having mechanical hysteresis so the plunger changes the switch from a first to a second state when the plunger is in one position and changes the switch back from the second to the first state when the plunger is in a different position, the plunger being disposed to engage the arm, means for moving the switch toward the surface so the plunger engages the arm and overcomes the yieldable means to move the sensing portion of the arm toward the surface, and means for moving the switch and plunger away from the surface so the sensing portion of the arm is urged away from the surface.

2. Apparatus for sensing the presence of frost on a surface of a component, the apparatus comprising an elongated leaf spring secured at one end to the component and having a free end disposed adjacent the surface, yieldable means urging the free end of the leaf spring away from the surface, a switch having a control plunger for operating it, the switch having mechanical hysteresis so the plunger changes the switch from a first to a second state when the plunger is in one position and changes the switch back from the second to the first state when the plunger is in a different position, the plunger being disposed to ride on the leaf spring, means for moving the switch toward the surface so the plunger engages the spring and overcomes the yieldable means to move the free end toward the surface, and means for moving the switch and plunger away from the surface so the free end of the spring is urged away from the surface.

3. Apparatus for sensing the presence of frost on a surface of a component, the apparatus comprising a movable arm having a sensing portion disposed adjacent the surface, yieldable means urging the sensing portion away from the surface, a switch having a control plunger for operating it, the switch having mechanical hysteresis so the plunger changes the switch from a first to a second state when the plunger is in one position and changes the switch back from the second to the first state when the plunger is in a different position, the plunger being disposed to engage the arm, rotatable cam means in contact with the switch to move it toward the surface so the plunger engages the arm and overcomes the yieldable means to move the sensing portion toward the surface.

4. Apparatus for sensing the position of a surface of a component, the apparatus comprising an elongated leaf spring secured at one end to the component and having one free end disposed adjacent the surface, a switch having a control plunger for operating it, the switch having mechanical hysteresis so the plunger changes the switch from a first to a second state when the plunger is in one position and changes the switch back from the second to the first state when the plunger is in a different position, the plunger being disposed to contact the leaf spring, rotatable cam means in contact with the switch, means for continuously rotating the cam, and yieldable means urging the leaf spring away from the surface and against the plunger so the switch follows the cam.

5. Apparatus for sensing the position of a surface of a component, the apparatus comprising a movable arm having a sensing portion disposed adjacent the surface, a switch having a control plunger for operating it, the switch having mechanical hysteresis so the plunger changes the switch from a first to a second state when the plunger is in one position and changes the switch back from the second to the first state when the plunger is in a different position, the plunger being disposed to contact the arm, rotatable cam means in contact with the switch, means for continuously rotating the cam means, and yieldable means urging the arm away from the surface and against the plunger so the switch and arm follow the cam.

References Cited in the file of this patent

UNITED STATES PATENTS

| | | |
|---|---|---|
| 1,966,099 | Levis | July 10, 1934 |
| 2,421,819 | Vandenberg | June 10, 1947 |
| 2,540,444 | Harland | Feb. 6, 1951 |
| 2,575,509 | Bayston | Nov. 20, 1951 |
| 2,642,180 | Grenishan | Jan. 6, 1953 |
| 2,704,441 | Morton | Mar. 22, 1955 |
| 2,867,092 | Perry | Jan. 6, 1959 |
| 2,927,440 | Kohl | Mar. 8, 1960 |
| 2,959,026 | Swanson | Nov. 8, 1960 |
| 2,995,905 | Ayres et al. | Aug. 15, 1961 |